(12) United States Patent
Holt

(10) Patent No.: US 7,548,192 B1
(45) Date of Patent: Jun. 16, 2009

(54) METHOD OF MAPPING STEEL REINFORCEMENTS IN CONCRETE FOUNDATIONS

(75) Inventor: J. Darrin Holt, Raleigh, NC (US)

(73) Assignee: FDH Engineering, Inc., Raleigh, NC (US)

( * ) Notice: Subject to any disclaimer, the term of this patent is extended or adjusted under 35 U.S.C. 154(b) by 0 days.

(21) Appl. No.: 12/027,503

(22) Filed: Feb. 7, 2008

(51) Int. Cl.
G01S 13/89 (2006.01)
G01S 13/88 (2006.01)
G01S 13/00 (2006.01)

(52) U.S. Cl. .......................... 342/191; 342/21; 342/22; 342/27; 342/175; 342/176; 342/179; 342/190; 342/195

(58) Field of Classification Search ............... 342/21, 342/22, 27, 82–103, 175, 176, 179, 190–197, 342/25 R–25 F; 367/87, 88, 99–116; 175/24, 175/26, 40, 45; 702/5, 127, 189
See application file for complete search history.

(56) References Cited

U.S. PATENT DOCUMENTS

| | | | | |
|---|---|---|---|---|
| 3,617,996 | A | * | 11/1971 | Herbert ...................... 367/105 |
| 3,831,173 | A | * | 8/1974 | Lerner ......................... 342/22 |
| 4,905,008 | A | * | 2/1990 | Kawano et al. ............... 342/22 |
| 4,937,580 | A | * | 6/1990 | Wills ........................... 342/22 |
| 5,446,461 | A | | 8/1995 | Frazier |
| 5,757,320 | A | * | 5/1998 | McEwan ...................... 342/22 |
| 5,819,859 | A | * | 10/1998 | Stump et al. ................. 175/26 |
| 6,186,006 | B1 | * | 2/2001 | Schmitz et al. ............. 342/179 |
| 6,295,512 | B1 | * | 9/2001 | Bryant ........................ 702/189 |
| 6,429,802 | B1 | | 8/2002 | Roberts |
| 6,512,475 | B1 | | 1/2003 | Bogatyrev et al. |
| 6,609,451 | B1 | * | 8/2003 | Inoue et al. .................. 342/22 |
| 6,700,526 | B2 | * | 3/2004 | Witten ......................... 342/22 |
| 6,772,091 | B1 | | 8/2004 | Roberts |
| 6,894,637 | B2 | * | 5/2005 | Moreira et al. ............... 342/22 |
| 7,003,400 | B2 | * | 2/2006 | Bryant .......................... 702/5 |
| 7,034,740 | B2 | * | 4/2006 | Witten ......................... 342/22 |

(Continued)

OTHER PUBLICATIONS

MALA Geoscience—Concrete, http://www.malags.com/Solutions/Market-Segments/Concrete.aspx, 5 pages.

(Continued)

*Primary Examiner*—Bernarr E Gregory
(74) *Attorney, Agent, or Firm*—Coats & Bennett, P.L.L.C.

(57) ABSTRACT

A method of mapping steel reinforcements in an existing concrete foundation. The method includes determining the depth of the concrete foundation. Further the method entails transmitting radar signals into at least one section of the concrete foundation and collecting reflection data in response to the radar signals being transmitted into the concrete foundation. Based on the collected reflection data, determining the general location of at least some of the steel reinforcements in the concrete foundation. Thereafter, surgically cutting into the concrete foundation and exposing at least some of the steel reinforcements in a portion of the concrete foundation. Once some of the steel reinforcements are exposed, the method entails measuring the size and spacing of the steel reinforcements. Based on the exposed steel reinforcements and the measurements taken, mapping the steel reinforcements throughout at least a portion of the concrete foundation by illustrating, for example, the size of steel reinforcements, the spacing between the steel reinforcements, and the location of the steel reinforcement relative to one or more selected dimensions of the concrete foundation.

11 Claims, 4 Drawing Sheets

U.S. PATENT DOCUMENTS

| | | | |
|---|---|---|---|
| 7,236,120 B2 * | 6/2007 | Healy et al. .................... | 342/22 |
| 7,355,545 B2 * | 4/2008 | Zemany et al. ................ | 342/22 |
| 2003/0076254 A1 * | 4/2003 | Witten ......................... | 342/22 |
| 2003/0112170 A1 * | 6/2003 | Doerksen et al. ............. | 342/22 |
| 2003/0193429 A1 * | 10/2003 | Campana et al. ............. | 342/22 |
| 2004/0155810 A1 * | 8/2004 | Witten ......................... | 342/22 |
| 2005/0179578 A1 * | 8/2005 | Healy et al. .................... | 342/22 |
| 2006/0250294 A1 * | 11/2006 | Zemany et al. ................ | 342/22 |
| 2007/0205937 A1 * | 9/2007 | Thompson et al. ............ | 342/22 |

OTHER PUBLICATIONS

StructureScan Optical by GSSI, "Nondestructive Concrete Inspection System," Geophysical Survey Systems, Inc., www.StructureScan.com, 7 pages.

\* cited by examiner

METHOD OF MAPPING STEEL REINFORCEMENTS IN CONCRETE FOUNDATIONS

SUMMARY OF THE INVENTION

Described herein is a method of mapping steel reinforcements in concrete foundations such as concrete foundations that support telecommunication towers. The method includes determining the depth of the concrete foundation and transmitting radar signals into at least one section of the concrete foundation. Transmitted radar signals produce reflection signals or data and this reflection data is collected. Based on the collected reflection data, the general location of steel reinforcements in at least one section of the concrete foundation is determined. Based on the determined general location of steel reinforcements in the concrete foundation, the method includes surgically cutting into the one section or area of the concrete foundation where steel reinforcements are expected to exist. By surgically cutting into the concrete foundation, portions of steel reinforcements are exposed. The method then includes measuring the size of the exposed steel reinforcements and measuring the spacing between exposed steel reinforcements. This basic process or method can be repeated for other sections of the concrete footing. Based on the exposed steel reinforcements and the measurements taken, the method includes mapping the steel reinforcements throughout the sections of the concrete footing by illustrating the size of steel reinforcements, the spacing between the steel reinforcements, and the location of steel reinforcements relative to one or more selected dimensions of the concrete footing.

Other objects and advantages of the present invention will become apparent and obvious from a study of the following description and the accompanying drawings which are merely illustrative of such invention.

DESCRIPTION OF EXEMPLARY EMBODIMENTS

Figure 1:
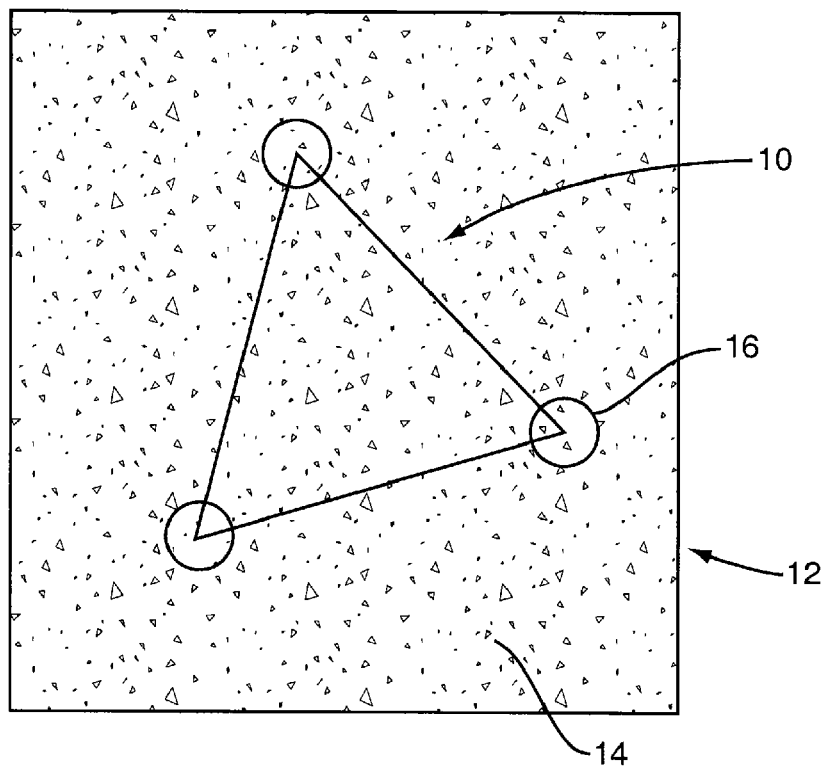
FIG. 1 is a top plan schematic view of a telecommunications tower supported on a concrete foundation.
Figure 2:
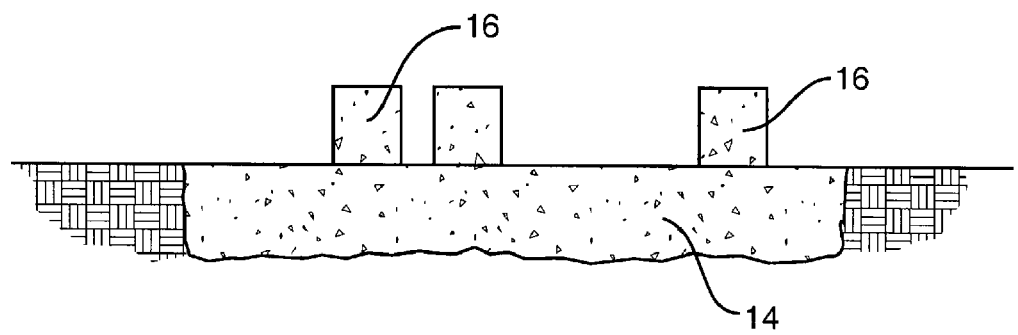
FIG. 2 is a side elevational view showing the concrete foundation of FIG. 1.

Before describing the method or process disclosed herein, it is beneficial to view the basic structure of a telecommunications tower and the foundation supporting the same. Shown in FIGS. 1 and 2 in schematic form is a telecommunication tower indicated generally by the numeral 10. Telecommunication tower 10 includes a concrete foundation indicated generally by the numeral 12. Concrete foundation 12 includes a concrete pad 14 and a plurality of concrete piers 16 that extend upwardly from the concrete foundation. The concrete piers 16 directly support the telecommunication tower 10.

Concrete foundation 12 includes steel reinforcements generally in the form of rebar. Typically rebar will be placed in the concrete foundation 12 in the form of grids and in some cases the grids of rebar will be disposed at various depths in the concrete foundation. In addition, or in other cases, the rebar steel reinforcements may be vertically disposed throughout various portions of the concrete foundation. However, years after constructing the concrete foundation 12, it may not be known how much steel reinforcements are actually present in the concrete foundation. Specifically, the location of the steel reinforcements is not known nor is the size and spacing of the steel reinforcements known. In many cases it is desirable to know the size, spacing and location of steel reinforcements throughout a concrete foundation in order to determine if additional loads can be carried by the superstructure or the structure being supported by the concrete foundation 12. This is especially true with telecommunication towers. Often it is desirable to add additional loads to telecommunication towers. However, before additional loads can be added, it is desirable to determine the structural make up of the underlying concrete foundation in order to determine if additional loads can be carried.

The present method is designed to determine the size and location of steel reinforcements in a concrete foundation through a minimally invasive process as will be described subsequently herein. The method or process described herein determines the depth of the concrete foundation 12 and further identifies one or more target areas in the concrete foundation. The term target area means an area that through testing suggest that steel reinforcements such as rebar may lie in a particular area or section of the concrete foundation 12. Once targets have been identified, then the process or method entails surgically cutting into selected but relatively small areas of the concrete foundation and exposing steel reinforcements therein. Once portions of the steel reinforcements are exposed, as will be described later, the steel reinforcements are measured and based at least in part on the measurements, a map or graphic is generated that illustrates the steel reinforcements in the concrete foundation.

Figure 3:
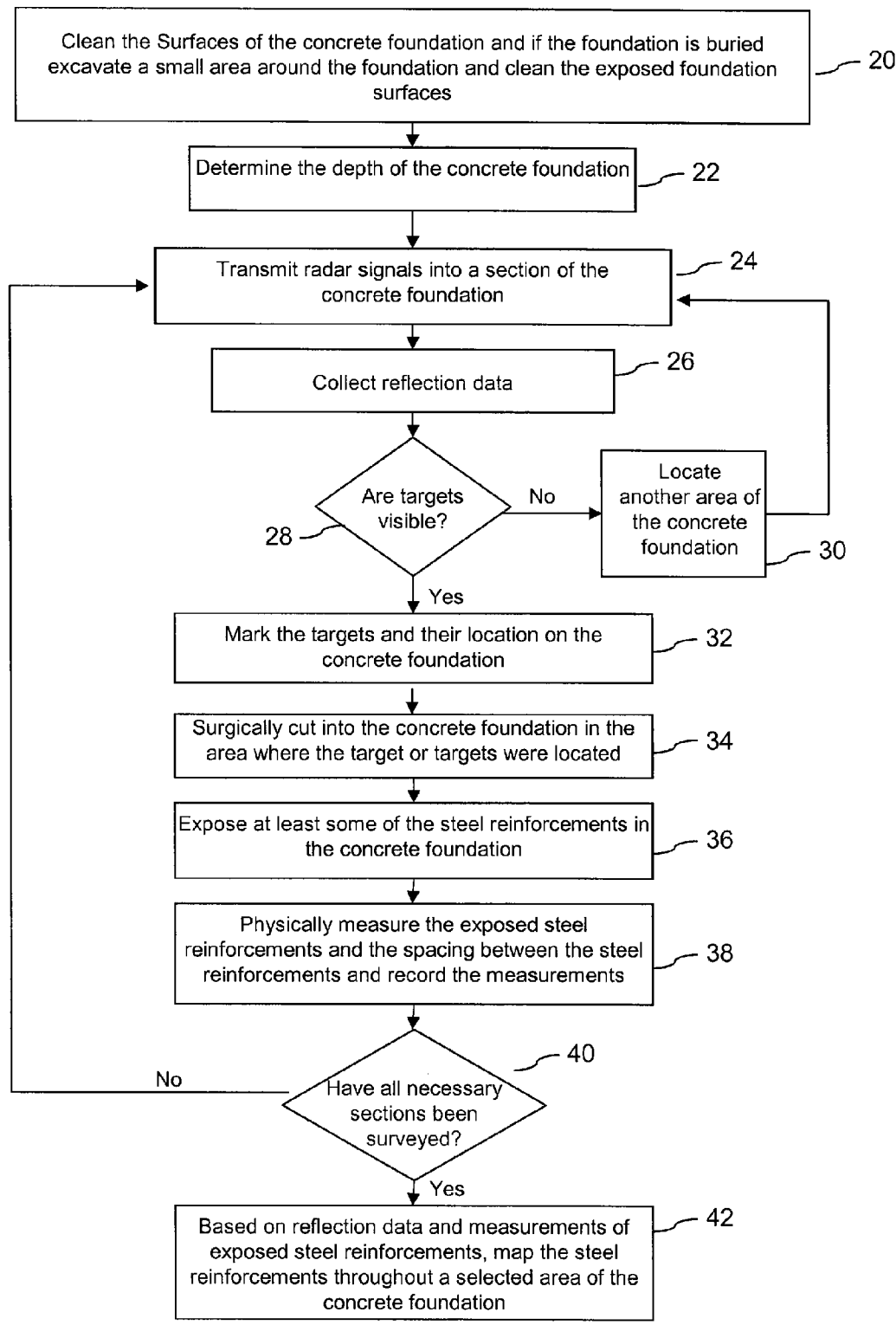
FIG. 3 is a flowchart illustrating the method of mapping steel reinforcements in concrete foundations.

With reference to the flowchart of FIG. 3, one procedure involved in the method entails cleaning the surfaces of the concrete foundation 12. If the concrete foundation is buried it may be beneficial to excavate a small area around the foundation and clean the exposed foundation surfaces (block 20). One procedure or step of the method is to determine the depth of the concrete foundation (block 22). There are several ways to determine or at least provide a good estimate of the depth of the concrete foundation 12. One approach is to temporarily mount a series of accelerometers on the top surface of the foundation 12. Then the foundation is struck with a handheld hammer. The waves generated by the blow of the hammer propagate up and down through the depth of the concrete foundation 12. The reflections received by the accelerometers are recorded and stored on a digital storage celoscope each time they pass the accelerometers. The data is then analyzed by a digital signal processing technique for example. This analysis permits computation of the time needed for a select group of frequencies to travel from the accelerometers to the bottom of the concrete foundation 12 and back to the top. The concrete foundation's vertical dimension is then computed based on the product of frequency velocity and the corresponding time required to travel between points.

Another part of the present method is to identify areas in the concrete foundation 12 where steel reinforcements may exist. This is sometimes referred to as identifying targets. This is achieved by transmitting radar signals into a section or a selected area of the concrete foundation (block 24). The radar signals are typically electromagnetic wave energy with a selected frequency range. Various frequencies may be used. It has been determined that a frequency range of approximately 1.5 GHz is suitable. The cleaning of the concrete serves to provide a relatively smooth surface. An antenna is pulled across the concrete surface where a technician marks possible targets from reflection data or reflections of the electromagnetic energy apparent on a visual data display. Multiple scans are performed, saved and processed to confirm target identification.

Systems and processes are known for identifying target areas such as rebar in concrete foundation. For example, see the disclosures found in U.S. Pat. Nos. 5,446,461; 6,429,882; 6,772,091; and 6,512,475, the disclosures of which are expressly incorporated herein by reference. Details of the systems will not be dealt with herein because such is not per say material to the present invention and because such systems and processes are well known in the art. However a brief discussion of utilizing the ground penetrating radar antennas to identify target areas in a concrete foundation may be in order. In this regard a small ground penetrating radar antenna can be used and this antenna may include two element pairs orthogonally oriented. Typically this is a ground coupled dual channel ground penetrating radar impulse antennae system working on a frequency of about 1.5 GHz or higher. Each of the element pairs includes a transmit dipole and a receive dipole. The dipoles are arranged to minimize mutual impedance between the elements so that the transmitted and received signals are not affected by the presence of the other pair of dipoles.

As indicated in block 24, the method entails transmitting radar pulses or signals into the concrete foundation. In response to the radar pulses or signals being transmitted into the concrete foundation, reflection or echo data will be generated. This reflection data is collected (block 26). Using conventional analysis, the reflected signal or data from the first and second received elements in the element pairs is analyzed to determine whether a reflection was due to a steel reinforcement or rebar in the concrete foundation 12. Details of the analysis tool is not dealt within here in detail because such is not per se material to the present invention and such procedures and analysis are known and practiced in the art.

In analyzing the collected reflection data, it is determined if there are targets visible (block 28). If there are no targets visible, then the process or method recycles. As indicated in block 30, another area or section of the concrete foundation is located (block 30). Once another area or section of the concrete foundation is located, the process of transmitting radar signals (block 24) and collecting reflection data (block 26) is repeated.

If the collected data indicates a target, then the targets are marked on the concrete foundation (block 32). Once the target or targets have been marked, then the method entails surgically cutting into the concrete foundation 12 in the area where the target or targets were located (block 34). The object of this step is to expose at least some of the steel reinforcements in the concrete foundation (block 36). Once some of the steel reinforcements are exposed, then certain measurements are taken. For example the size of any exposed rebar is measured and the data recorded. Furthermore the spacing between adjacent steel reinforcements is measured and recorded. In the exposed area of the steel reinforcements, technicians will examine the steel reinforcements to see if a consistent pattern is found. In some cases it may be desirable to surgically cut into adjacent areas to confirm the pattern in order to improve the integrity and reliability of the mapping.

After one section or area of the concrete foundation has been surgically explored based on the identification of one or more targets in the area or section, then it is determined if all of the sections of the concrete foundation have been surveyed or if sufficient sections or areas have been surveyed (block 40). In some cases the investigator will be able to reliably predict the layout of steel reinforcements in a concrete foundation based on one or a few surgical cuts. However in other cases based on previous surgical cuts and investigations, the investigator decides that other sections or areas of the concrete foundation should be surveyed. In these cases, the method or process is continued. Another area of the concrete foundation 12 is identified and radar signals or pulses are transmitted into the concrete foundation 12 in these areas. If targets are identified in this area, the concrete foundation is surgically cut to expose additional steel reinforcements. Again certain measurements are taken of the steel reinforcements. These measurements include the cross-sectional size of the steel reinforcements, and the spacing between adjacent reinforcements. Again the investigator will attempt to detect a pattern or a layout of the steel reinforcements that will be utilized in a mapping exercise to follow.

Eventually the investigator will have surveyed a substantial area or substantial sections of a concrete foundation 12 or at least enough areas or sections to provide a reasonably reliable map of the steel reinforcements in the concrete foundation. Based on the reflection data and measurements of exposed steel reinforcements, the method maps the steel reinforcements throughout the concrete foundation 22. An example of the mapping is shown in FIGS. 4 and 5.

Figure 4:
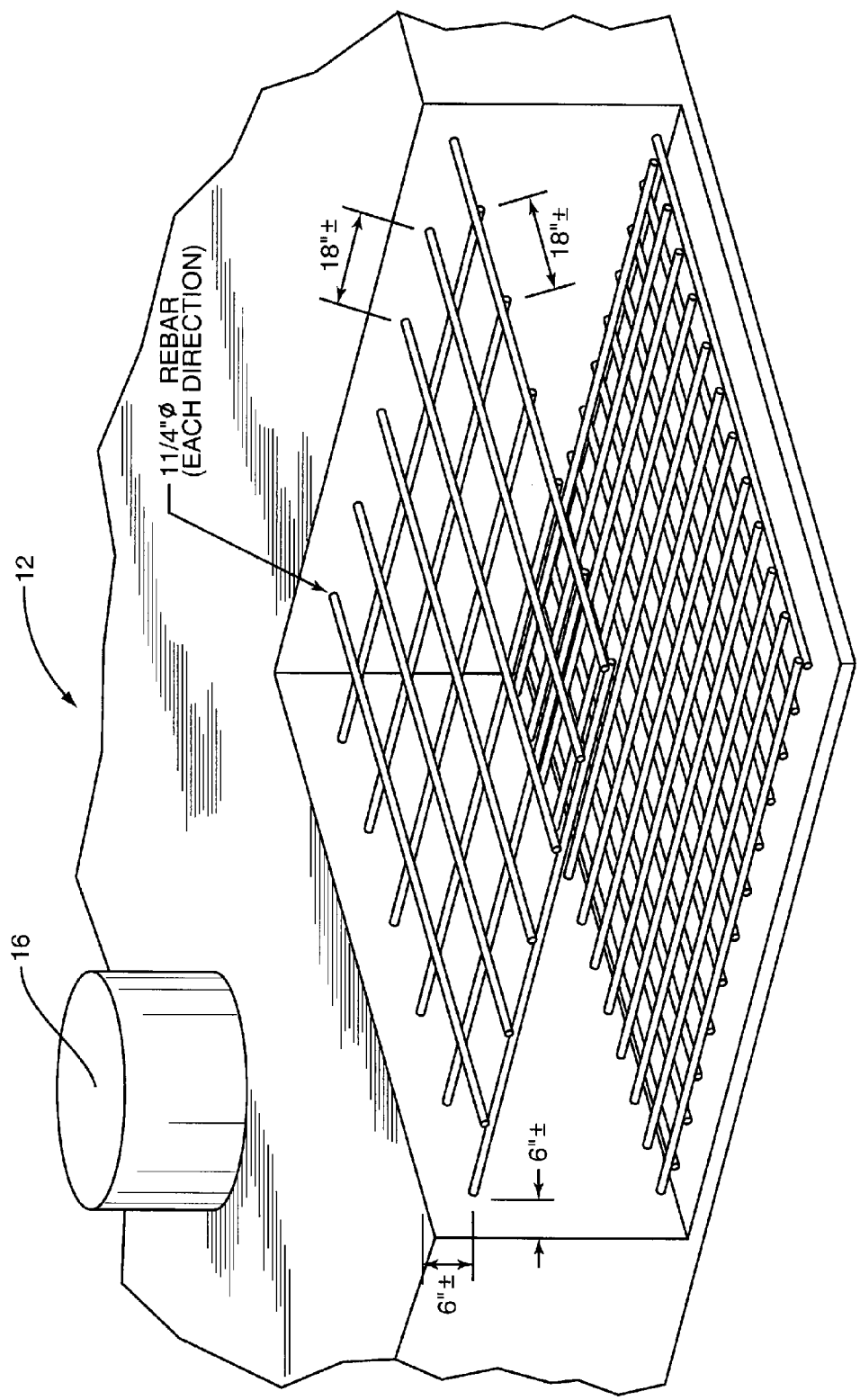
FIG. 4 illustrates a mapping of steel reinforcements in the pad portion of the concrete foundation.

The mapping generated in FIG. 4 shows a cut away view of the concrete pad 14. The mapping further shows two grid networks of steel reinforcements, an upper network and a lower network. Note that the upper network includes a series of 1¼" rebar. The rebar is spaced 18 inches apart. In addition the upper network of rebar is spaced approximately six inches from the top surface of the concrete pad 14. In the case of this example, the investigators were able to reliably predict the size, spacing and location of the rebar in the concrete foundation 12.

During the investigation, the investigator in this example was able to identify a second grid layer of rebar in the concrete foundation 12. This is the lower grid of rebar shown in FIG. 4. However in this example, without substantial excavation it was not practical or feasible for the investigator to expose the lower grid of rebar sufficient to predict the size and spacing with a high degree of reliability. However based on the reflection data, the investigator postulated that the bottom grid of steel reinforcements was present and in a tighter grid pattern than the upper layer of steel reinforcements.

Figure 5:
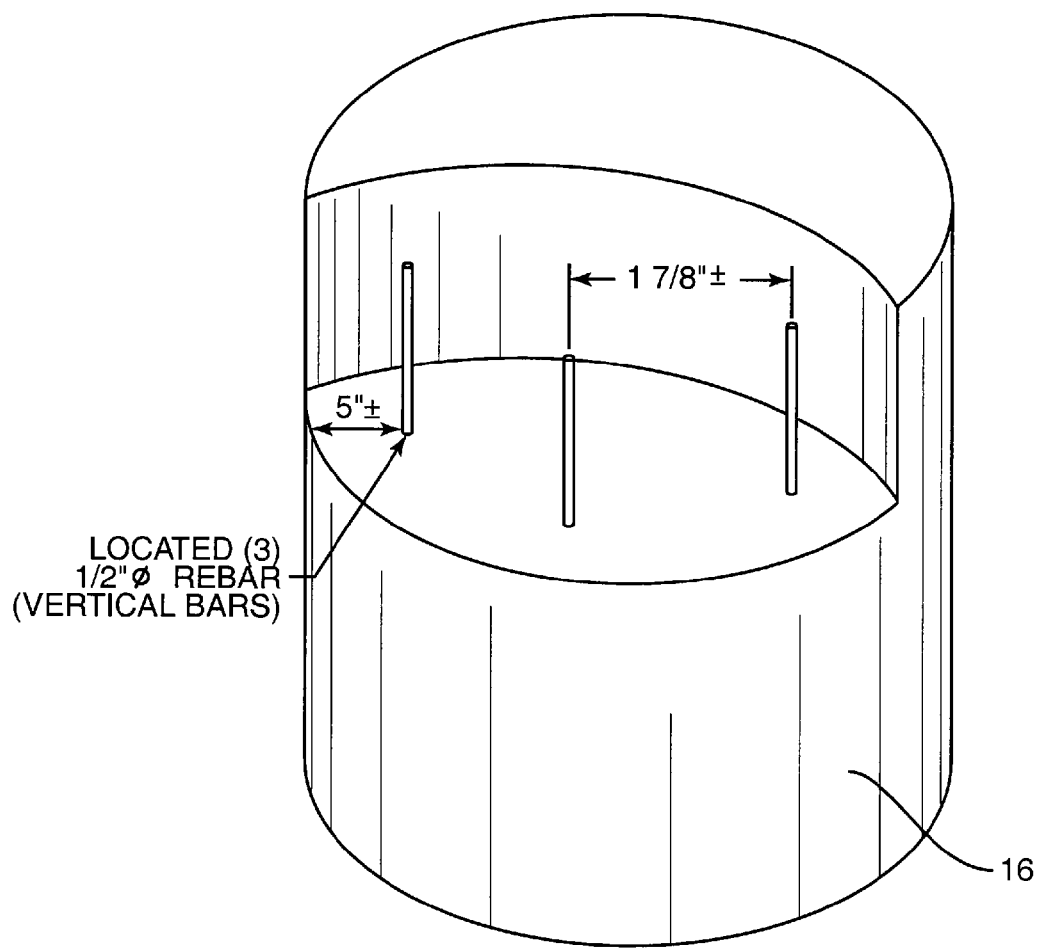
FIG. 5 illustrates a mapping of the steel reinforcements found in one of the piers of the concrete foundation.

Turning to FIG. 5, another mapping exercise is shown. This mapping shows the vertical steel reinforcement in one of the piers 16. In the cutout section shown in the concrete pier 16, note that three ½" vertical bars were located. They are located approximately one foot and seven eighth inches apart and as indicated by FIG. 5 are spaced approximately five inches inwardly from the outer wall of the concrete pier 16.

Thus in the case of the concrete foundation 12, the resulting map of the steel reinforcements enable structural engineers to better appreciate the structural makeup of the foundation. This is useful information in determining if additional loads can be added to telecommunication towers or any other superstructures that are supported on a concrete foundation 12. It is appreciated that the accuracy and reliability of such mapping can vary depending on many factors including for example, the size of the concrete foundation, how much of the concrete foundation is exposed, the integrity of the concrete itself, how much surgical cutting can be tolerated, and the time and effort that is to be devoted to the analysis.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method of mapping steel reinforcements in a concrete foundation of a telecommunications tower, comprising:
   a. propagating waves from the top of the concrete foundation, downwardly to the bottom of the concrete foundation, and back to the top of the concrete foundation;
   b. determining the depth of the concrete foundation by computing the time required for one or more wave frequencies to travel from the top of the concrete foundation to the bottom of the concrete foundation and back to the top of the concrete foundation;
   c. transmitting radar signals into one section of the concrete foundation;
   d. collecting reflection data in response to the radar signals being transmitted into the one section on the concrete foundation;
   e. determining the general location of steel reinforcements in the one section of the concrete foundation based on the collected reflection data;
   f. based on the determined general location of steel reinforcements in the concrete foundation, surgically cutting into the one section of the concrete foundation and exposing at least some of the steel reinforcements in the one section of the concrete foundation;
   g. measuring the size of the exposed steel reinforcements and measuring the spacing between the exposed steel reinforcements;
   h. repeating the above steps for one or more other sections of the concrete foundation and measuring the size and spacing of exposed steel reinforcements in one or more other sections of the concrete foundation; and
   i. based on the exposed steel reinforcements and the measurements taken, mapping the steel reinforcements throughout the sections of the concrete foundation of the telecommunication tower by illustrating the size of the steel reinforcements, the spacing between the steel reinforcements, and the location of the steel reinforcements relative to one or more selected dimensions of the concrete foundation.

2. The method of claim 1 wherein only portions of the steel reinforcements in the concrete foundation are exposed; and based on the reflection data and the exposed steel reinforcements, projecting the size and arrangement of the steel reinforcements throughout substantially the entire concrete foundation.

3. The method of claim 1 including mapping multi grid layers of steel reinforcements throughout a substantial depth of the concrete foundation and illustrating the distance between grid layers.

4. The method of claim 1 including generating a three dimensional graphic showing the steel reinforcements throughout the concrete foundation.

5. The method of claim 1 wherein propagating waves through the concrete foundation includes striking the concrete foundation with an object.

6. The method of claim 5 including disposing at least one accelerometer on the concrete foundation and sensing reflections of the propagated waves with the accelerometer.

7. The method of claim 6 including storing the reflections from the propagated waves on a digital storage oscilloscope each time the waves are sensed by the accelerometer.

8. The method of claim 1 wherein the radar signals transmitted into the concrete foundation have a frequency range of approximately 1.5 GHz.

9. The method of claim 1 including after determining the general location of steel reinforcements, drilling into the concrete foundation with a drill and exposing portions of steel reinforcements.

10. A method of mapping steel reinforcements in a concrete foundation, comprising:
    a. determining the depth of the concrete foundation;
    b. transmitting radar signals into one section of the concrete foundation;
    c. collecting reflection data in response to the radar signals being transmitted into the one section of the concrete foundation;
    d. determining the general location of steel reinforcements in the one section of the concrete foundation based on the collected reflection data;
    e. based on the determined general location of steel reinforcements in the concrete foundation, surgically cutting into the one section of the concrete foundation and exposing at least some of the steel reinforcements in the one section of the concrete foundation;
    f. measuring the size of the exposed steel reinforcements and measuring the spacing between exposed steel reinforcements;
    g. repeating the above steps for one or more other sections of the concrete foundation and measuring the size and spacing of exposed steel reinforcements in one or more other sections of the concrete foundation; and
    h. based on the exposed steel reinforcements and the measurements taken, mapping the steel reinforcements throughout the sections of the concrete foundation by illustrating the size of steel reinforcements, the spacing between the steel reinforcements, and the location of the steel reinforcements relative to one or more selected dimensions of the concrete foundation.

11. The method of claim 10 wherein only portions of the steel reinforcements in the concrete foundation are exposed, and based on the reflection data and exposed steel reinforcements, projecting the size and arrangement of the steel reinforcements throughout substantially the entirety of the concrete foundation and mapping the size and arrangement of the steel reinforcements throughout substantially the entirety of the concrete foundation.

* * * * *